Oct. 3, 1967     B. L. A. VAN DER SCHEE     3,345,041

METHOD AND APPARATUS FOR TREATING HIGHLY VISCOUS MATERIAL

Filed Dec. 17, 1964     3 Sheets-Sheet 1

INVENTOR.
BERNARD LOUIS ANTON VAN DER SCHEE
BY
ATTORNEY

Oct. 3, 1967  B. L. A. VAN DER SCHEE  3,345,041
METHOD AND APPARATUS FOR TREATING HIGHLY VISCOUS MATERIAL
Filed Dec. 17, 1964  3 Sheets-Sheet 2

INVENTOR.
BERNARD LOUIS ANTON VAN DER SCHEE
BY
ATTORNEY

Oct. 3, 1967  B. L. A. VAN DER SCHEE  3,345,041
METHOD AND APPARATUS FOR TREATING HIGHLY VISCOUS MATERIAL
Filed Dec. 17, 1964  3 Sheets-Sheet 3

INVENTOR.
BERNARD LOUIS ANTON VAN DER SCHEE
BY
ATTORNEY

United States Patent Office 3,345,041
Patented Oct. 3, 1967

3,345,041
METHOD AND APPARATUS FOR TREATING
HIGHLY VISCOUS MATERIAL
Bernard Louis A. van der Schee, Arnhem, Netherlands, assignor to American Enka Corporation, Enka, N.C., a corporation of Delaware
Filed Dec. 17, 1964, Ser. No. 419,129
Claims priority, application Netherlands, Dec. 23, 1963, 302,442
5 Claims. (Cl. 259—6)

ABSTRACT OF THE DISCLOSURE

Mixing process and apparatus for treating highly viscous, plastic-like materials comprising continuously agitating the material and continuously transforming at least a portion of the material into thin layers or films and forming a plurality of ribs on the surface of the thin layer or film for the purpose of increasing the surface areas thereof.

This invention relates to a method and apparatus for treating highly viscous material. The invention may be utilized with all highly viscous substances in which a mixing or blending of the substances is desired. Specifically, synthetic polymers may be treated by the apparatus of the invention to evaporate gaseous components therefrom during polymerization.

Mixing apparatus for use in continuous polymerization processes are known. For instance, when it is necessary to increase the chain length of synthetic polymers by polycondensation, means must be devised to create a maximum surface area in the polymer to allow evaporation of gaseous components during polycondensation. When homogenizing a plurality of highly viscous fluids, mixing apparatus requires increased power and such large power requirements present many problems in design. The object of all such mixing devices is to provide, per unit of time, a maximum surface area on the fluid or fluids being treated. This is true whether the material being worked upon is to be degasified, emulsified, or mixed. Some of the known apparatus used to mix highly viscous material create fresh surfaces in the material being worked upon by positioning the material between parallel, continuously rotating rollers. In such apparatus a gob of viscous material is drawn by rotation of the parallel rollers into the gap or nip between the rollers, spread into a thin film, transported on the surface of the rollers for additional mixing, and finally removed from the roller surface after several mixing cycles.

Apparatus of this type is well known in the mixing field and is disclosed in Patents No. 2,758,915 and No. 2,976,- 565. In the latter patent, material intended to be mixed is introduced between parallel, oppositely rotating rollers. The material is mixed by a reorientation bar which cuts and rolls the film of material from the surface of the main roller as it is introduced into the nip or restricted space between the rollers. The reorientation bar may be adjusted to produce the degree of mixing desired. The material, after each mixing step, forms a layer on the major roller of the apparatus. This layer presents a surface area which is again directed to the mixing reorientation bar. Removal of the material from the mixing vessel is accomplished by scraping the layer of material from the main roller by use of a knife blade.

Patent No. 2,758,915 also discloses apparatus for providing increased surface area during mixing and is composed of a plurality of rotating, intermeshed discs which dip into the material being treated, tumbling it to expose more material surface to a vacuum imposed on the apparatus. While this apparatus exposes a larger surface area of material than the first apparatus mentioned, there is a loss in mixing ability because adjacent portions of the material are isolated into compartments formed by the discs and the wall of the mixing chamber. Additionally, the plurality of rotating discs are much weaker than the plural roller device disclosed in Patent No. 2,976,565 and strength is of great importance when mixing highly viscous materials.

It is an object of the present invention to alleviate the disadvantages of the above-mentioned treating apparatus while providing greater surface area exposure in the material being treated.

An object of the present invention is to provide a method of mixing highly viscous material.

An additional object of the invention is to produce a method whereby maximum surface area of a synthetic resinous material may be presented to improve polymerization thereof.

Another object of the present invention is to provide apparatus for mixing highly viscous material in which maximum surface area of the material can be exposed during mixing thereof.

These and other objects of the invention will become apparent from the following description and accompanying drawings.

The present invention is an improvement in the parallel cylindrical roller type mixing apparatus heretofore used for handling highly viscous material. The improvement allows greater material surface exposure, provides more homogeneous mixing of materials being treated, and maintains apparatus strength without sacrifice to increased power consumption. The improvement consists of providing a comb device located between the rollers, the teeth of the comb extending into the nip area formed by the adjacent surfaces of the rollers. By use of this comb device, the surface of material to be blended, mixed, or degasified, as it is formed on the roller surface, is given a rib formation. This rib formation exposes a larger total film surface area to the surrounding air, increasing degasification of the material. As a result of the action of the comb teeth on the material surface, the surface area of the material is enlarged by a factor of 2–4, depending on the selected distance between the teeth of the comb.

It has been found that the formation of the ribs may be promoted if the teeth of the comb are hollow, forming a plurality of conduits in open communication with the ambient atmosphere. A slight gas pressure is created in the teeth as the material entrained between the rollers passes the open ends of the teeth to initiate and facilitate rib formation at the beginning of the process. The teeth are preferably flat and disposed transverse to the longitudinal axes of the rollers. The number and spacing of the teeth control the total film surface area obtained.

As the rollers rotate, the gob of material located between the rollers above the nip area is agitated and intermixed by the action of the roller surfaces. Material from the lower portion of the gob is forced, by the rollers, into the nip area between the rollers and is pressed into a thin sheet. The comb teeth which extend into the nip between the rollers produce a regular displacement pattern in the sheet of material being formed. As this sheet leaves the underside of the nip between the rollers, the adhesive effect of the roller surfaces causes the sheet to split into two layers, one of which adheres to the surface of each roller. The displacement of material created by the comb teeth forms high ribs in the material layers as they separate upon leaving the nip of the rollers. These thin, high ribs remain in the material layers due to the viscosity of the material. The layers of material having ribbed configuration are transported on the surface of the rollers back to the main gob of material on top of the rollers where they are recombined and mixed into the gob.

The ribbed configuration also improves the mixing of the material. As the material layers are forced back into the gob, the upstanding ribs are ruffled or pleated by the action of the gob, forcing them out of their original planes and creating a folding action in the material as it enters the gob mass. Thus, it is clear that the effect obtained by providing increased surface area in the form of raised ribs or ridges is advantageous whether the apparatus is used as a mixer, degasifier, homogenizer, or emulsifier.

The invention will be further explained in the following detailed description and accompanying drawings wherein.

Figure 4:
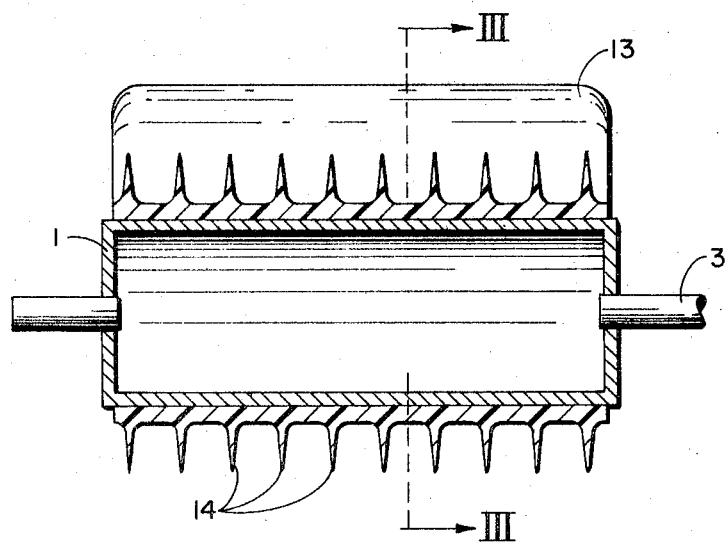
Figure 3:
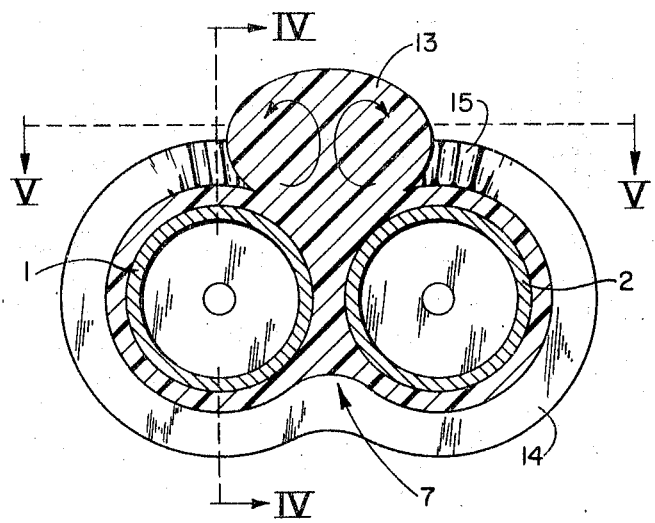

FIG. 3, in schematic form, shows a cross-sectional profile of a reaction mixture being treated by the apparatus of the invention, such section being taken along line III—III of FIG. 4.

FIG. 4 is a schematic section presentation of the profile of the reaction mixture taken along line IV—IV of FIG. 3.

Figure 5:
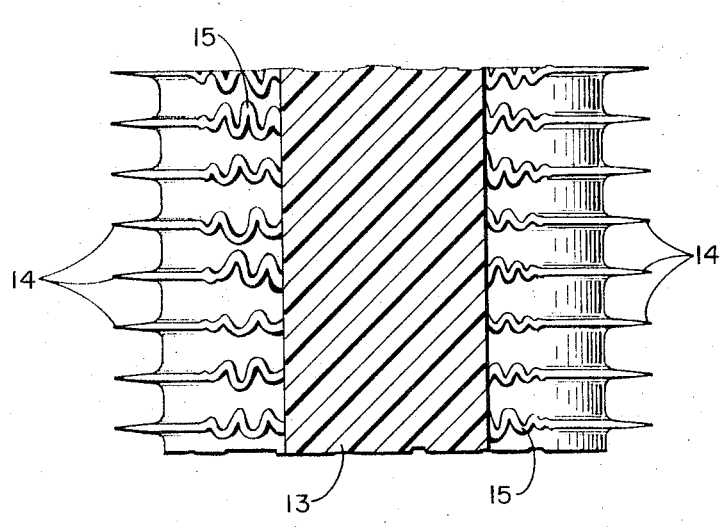

FIG. 5 is a cross-sectional plan view of the reaction mixture profile shown in FIGS. 3 and 4, taken on line V—V of FIG. 3.

Figure 6:
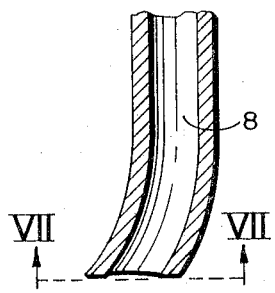

FIG. 6 shows, on enlarged scale, a longitudinal section of one tooth of the comb of the invention.

Figure 7:
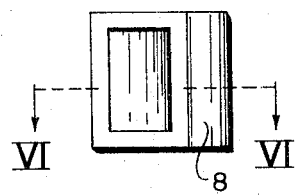

FIG. 7 is an inverted plan view of the enlarged tooth section shown in FIG. 6.

Figure 1:
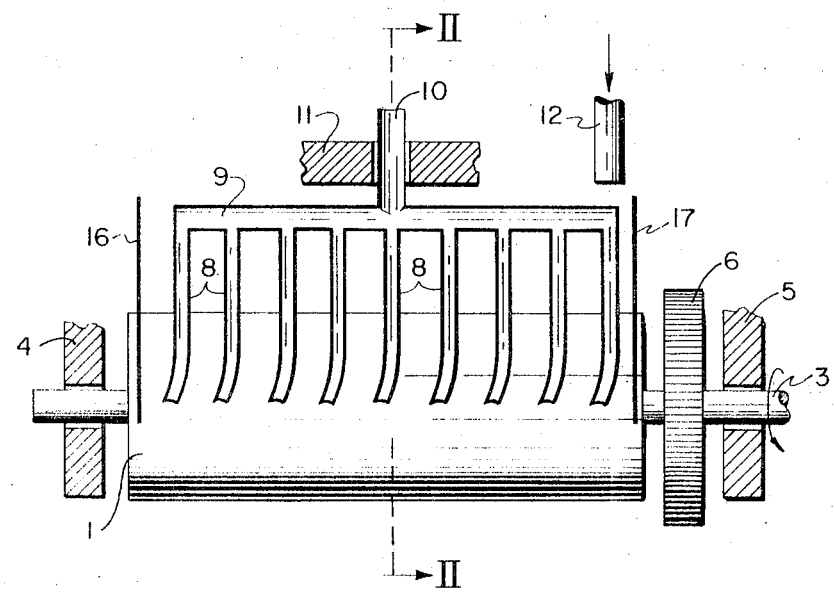
FIG. 1 shows the apparatus of the invention in a longitudinal section taken on line I—I of FIG. 2.
Figure 2:
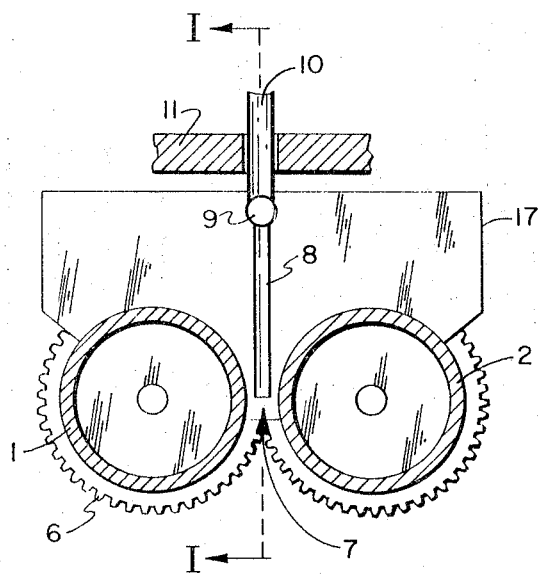
FIG. 2 is a cross section of the rollers showing the position of the comb with respect to the nip created by the rollers and is taken on line II—II of FIG. 1.

In FIGS. 1 and 2, parallel, cylindrical rollers 1 and 2 are positioned at a distance from each other. Roller 2 is mounted on a freely rotatable shaft and roller 1, on shaft 3, is driven by roller 2. The rollers rotate in the direction indicated by the arrow. The supporting shafts are mounted for rotation in bearings 4 and 5. The rollers 1 and 2 are inter-coupled by means of identical gears, one of which, 6, is shown. They are connected in such a way that they rotate in opposite directions and at the same speed. A comb device is located above the rollers and has hollow, open-ended teeth 8 which extend downward between the rollers. The teeth 8 are connected by distribution tube or header 9 to a support tube 10 which is adjustably attached to a conventional sealed housing surrounding the entire apparatus. A part of the housing 11 is shown. The hollow teeth 8, header 9, and tubular supporting tube 10 form a conduit open to the atmosphere. The material to be treated by the mixing apparatus is fed into the nip section 7 of the rollers by supply conduit 12. The entire apparatus may be maintained under vacuum conditions by conventional pumping means attached to the sealed housing. The material introduced through conduit 12 flows to the opposite end of the rollers and may be removed from the mixer by conventional means (not shown). Movement of the material from inlet conduit 12 along the surface of the rollers to discharge point may be aided by curving the ends of teeth 8 as shown in FIG. 1.

As shown in FIGS. 3 and 4, the highly viscous material mass 13 is positioned between the rollers in the form of a large gob or roll. The roll of material is enclosed at each end of the rollers by partitions 16 and 17, shown schematically in FIG. 1. The position of the roll 13 is extremely stable and its shape is governed by the viscosity of the liquid and the speed of the rollers 1 and 2. Inside this roll, the material mass is circulating vigorously in directions indicated by the arrows. Part of the liquid is continuously transported by the rollers through the nip 7 created between the rollers and separated into two films each of which is entrained by a roller. As the material film thus formed travels to the top of the rollers it is pressed back into roll 13. FIG. 5 shows, in plan view, a pleating or ruffling effect 15, is produced by the gob or roll 13 in the ribs as they are fed into the mass. The ruffling effect is particularly advantageous in blending and emulsifying operations as will be pointed out.

The action of teeth 8 causes a thinning of the film of material on rollers 1 and 2 and high membranous liquid ribs 14 are formed in transverse planes between the teeth. Note particularly FIGS. 3 and 4. The height of these ribs is preferably between 1–1.5 times the width of the space between them. However, such spacing and rib height may be controlled by the number of teeth utilized and the distance between rollers 1 and 2. Utilizing a tooth spacing to produce ribs having a height of 1–1.5 times the width, a surface enlargement of 200–300 percent is obtained in the material on the rollers.

FIGS. 6 and 7 show the hollow tip configuration of tooth 8 in which the tooth is bent to aid transportation of the material.

Increase in the material surface area is highly desirable when the apparatus of the invention is used to increase the chain length of a synthetic polymer obtained from ethylene terephthalate by polycondensation. In such a process the viscosity of the polymer can be increased by evaporating glycol from the reaction mixture. Experiments have shown that ethylene terephthalate treated in the present apparatus produces a glycol evaporation rate 3–4 times greater than that obtained with conventional roller mixers.

In addition to improved degasification, it has been found that with the use of the novel comb-tooth arrangement a greater homogenization of the material can take place. The liquid ribs 14, as they are pressed into the agitating mass of material 13, are folded into pleats 15 which produce a reorientation in the material. Additionally, as the material stream gradually shifts from the inlet position on the rollers to its point of removal at the opposite end of rollers 1 and 2, the ribs 14 created by the teeth 8 remain in the same position relative to the entrance and exit positions. Because of this, all portions of the material stream successively pass all the teeth, allowing a mixing of the material even more thoroughly.

If the apparatus is used as an emulsifying machine, a gas or low viscosity liquid may be effectively collected in the pleats 15 and consequently spread through the material mass 13. The low viscosity substance to be emulsified may be injected into the highly viscous material mass at any point. A satisfactory method of combination has been found to be when the highly viscous substance is fed through the roller system in the normal manner and the entire apparatus is bathed in an atmosphere of the low viscosity substance.

As an alternative method of mixing and agitating the material being treated, the comb and teeth may be vibrated in the longitudinal direction of rollers 1 and 2. Furthermore, although the teeth are shown in FIG. 1 to be directed at their ends toward the outlet end of the apparatus to aid in transporting the material through the system, they may be straight.

Depending on the nature of the process to be carried out by the apparatus, the clearance between the rollers and the distance between the teeth may be varied. It has been found, however, that for most treatments a roller clearance from 2–50 mm. and a tooth distance from 5–100 mm. may be used. In one particular embodiment with rollers having 400 mm. diameters, a clearance distance between the rollers of 16 mm. produced a rib height of 60 mm.

It is obvious from the above description that the invention may be used to perform a variety of functions and the methods of material treatment practiced thereby may vary. The extent and scope of the invention is therefore to be limited only by the following claims.

What is claimed is:

1. In an apparatus for treating highly viscous material having parallel cooperating cylindrical rollers positioned alongside each other to form a material receiving nip portion, a drive system for rotating the rollers in opposite directions, a material inlet located at one end of the rollers, the improvement comprising means extending into the nip of the rollers for increasing the surface area of the material being treated therein and which is exposed to ambient atmosphere.

2. Apparatus as defined in claim 1 in which said means comprises hollow open-ended teeth flattened in planes perpendicular to the axis of the rollers.

3. Apparatus as defined in claim 2 in which the ends of the teeth are bent in the direction of the material outlet end of the rollers.

4. In an apparatus for treating highly viscous substances in which plural parallel rollers are located adjacent each other and are rotated in opposite directions to agitate a highly viscous substance held in the nip area between the rollers, the improvement comprising a comb device having a plurality of hollow-open-ended teeth extending into the roller nip area in the direction of rotation of the rollers and a header connecting the plurality of hollow teeth in fluid flow relationship, and a fluid supply pipe supporting the comb device and communicating with said header.

5. In a process for treating highly viscous material comprising the steps of continuously agitating a mass of the material, continuously transforming a portion of the mass into a thin layer, degasifying the layer, and returning the layer to the agitating mass, the improvement comprising forming a plurality of ribs on the surface of the thin layer to expose a greater amount of the material while being degasified.

References Cited

UNITED STATES PATENTS 2,645,813    7/1953    Swallow _____ 18—2
3,029,723    4/1962    Schweer _____ 99—237

WILLIAM I. PRICE, *Primary Examiner.*

J. M. BELL, *Assistant Examiner.*